TRANSISTOR CONTROLLED DIGITAL COUNT INDICATOR

Filed March 27, 1959 2 Sheets-Sheet 1

INVENTOR.
HAMILTON C. CHISHOLM

BY Alvin E. Hendricson

ATTORNEY

TRANSISTOR CONTROLLED DIGITAL COUNT INDICATOR

Filed March 27, 1959 2 Sheets-Sheet 2

INVENTOR.
HAMILTON C. CHISHOLM
BY Alvin E. Henderson
ATTORNEY

3,172,095
TRANSISTOR CONTROLLED DIGITAL COUNT INDICATOR

Hamilton C. Chisholm, Richmond, Calif., assignor to Beckman Instruments, Inc., Fullerton, Calif., a corporation of California Filed Mar. 27, 1959, Ser. No. 802,492
5 Claims. (Cl. 340—324)

The present invention relates in general to an indicating circuit for an electronic counter, and more particularly to an indicating circuit adapted to provide count indications for a low power counter having insufficient driving power available to operate indicating means.

The present invention is adapted for connection to and utilization with conventional electronic counting circuits and in particular with transistorized counter circuits. Although the present invention is equally well adapted for cooperation with counting circuits employing any radix the following description is referenced to a decade counter for convenience of description.

Conventional decade counters employing vacuum tube circuitry, generally comprising four bistable circuits, or flip-flop circuits, are normally operated at a relatively high direct current voltage as is required by the vacuum tube circuitry. A common and integral part of this type of decade counter is a resistor matrix connected to control neon lamp count indicators for providing instantaneous and continual visual indication of the number of counts received by the counting circuit. Such conventional count indicating circuitry requires relatively large potentials for operating the neon lamps to ionize same and deionize same so that a substantial voltage variation is necessary for satisfactory count indication. Although such potentials and potential variations are readily available in vacuum tube circuitry, this is not the case for transistorized decade counters. One of the prime objectives of transistorized circuitry is to minimize the supply voltage required and to minimize the operating power of the circuit so that in a well designed transistorized decade counter insufficient power is available to operate conventional neon lamp count indicators, and furthermore the voltage swing or variation necessary to properly turn on and off neon lamps is not available. Inasmuch as counting devices are frequently required to provide a visual indication of the stored count it is then necessary for transistorized counters to have associated therewith additional or separate circuitry to provide such visual indication. The present invention relates to such auxiliary circuitry providing count indicating and particularly adapted for connection to and cooperation with transistorized decade counters.

It is contemplated by the present invention that there shall be received, at four input terminals thereof, conventional count signals from a decade counter and comprising, for example, one, two, four, and eight count indications which in appropriate combination will be seen to provide a complete decade count. Count indication is herein provided with five pairs of incandescent lamps connected across odd and even busses which are in turn connected through a transistor switch to one side of a power supply and such switch is coupled to the zero and one count input terminal of the indicator. Connection is made from the junction of the lamp of each pair thereof through a tree circuit composed of a plurality of transistor switches to the opposite side of said power supply with connections for controlling such switches from the remaining input terminals of the count indicator. In order to minimize circuit complexity of the count indicator, the transistor switches connected in series parallel combination as a tree circuit, described in detail below, are provided with continuous circuits across the power supply through indicator lamps regardless of the switching position of the odd and even trigger circuit noted above so as to thereby continually provide base driving power for those transistors required to operate for completing a circuit through one particular lamp to be lighted by a count indication. The lamps employed in the present count indicator thus function as resistive elements during the period in which they are not energized to incandescence and through the use of transistor elements in the switching means of the tree circuit it is herein possible to utilize incandescent lamps as such resistive elements inasmuch as the base drive current required to operate the transistors is insufficient to light the lamps and actual lamp incandescence is produced through the collector-emitter circuit of the transistors.

It is an object of the present invention to provide an improved count indicator circuit for low-power counters.

It is another object of the present invention to provide a transistorized count indicator circuit including a transistor trigger for energizing even and odd busses in response to zero and one count input signals together with a tree circuit formed of a plurality of transistor switches for selectively connecting individual indicating means to an energized buss in accordance with higher count input signals.

It is a further object of the present invention to provide a count indicator circuit for low-power counting circuits and including a plurality of incandescent lamps connected together with transistor switches for individual indicating energization in response to input counts and arranged with said switches for comprising resistive circuit elements during periods of non-count energization.

It is yet another object of the present invention to provide a transistorized count indicator for a low-power decade counter adapted to connect indicating devices across a power supply in response to counts received from the decade counter.

It is still another object of the present invention to provide a materially simplified count indicator circuit for producing visual indication of the number of stored counts in a low-power decade counter.

Numerous other objects and advantages of the present invention will become apparent to those skilled in the art from the following description of the invention. Although the description of the invention is herein referenced to particular preferred embodiments thereof, no limitation is intended thereby, but instead reference is made to the appended claims for a precise delineation of the true scope of the present invention.

The invention is illustrated in the accompanying drawings, wherein.

Figure 1:
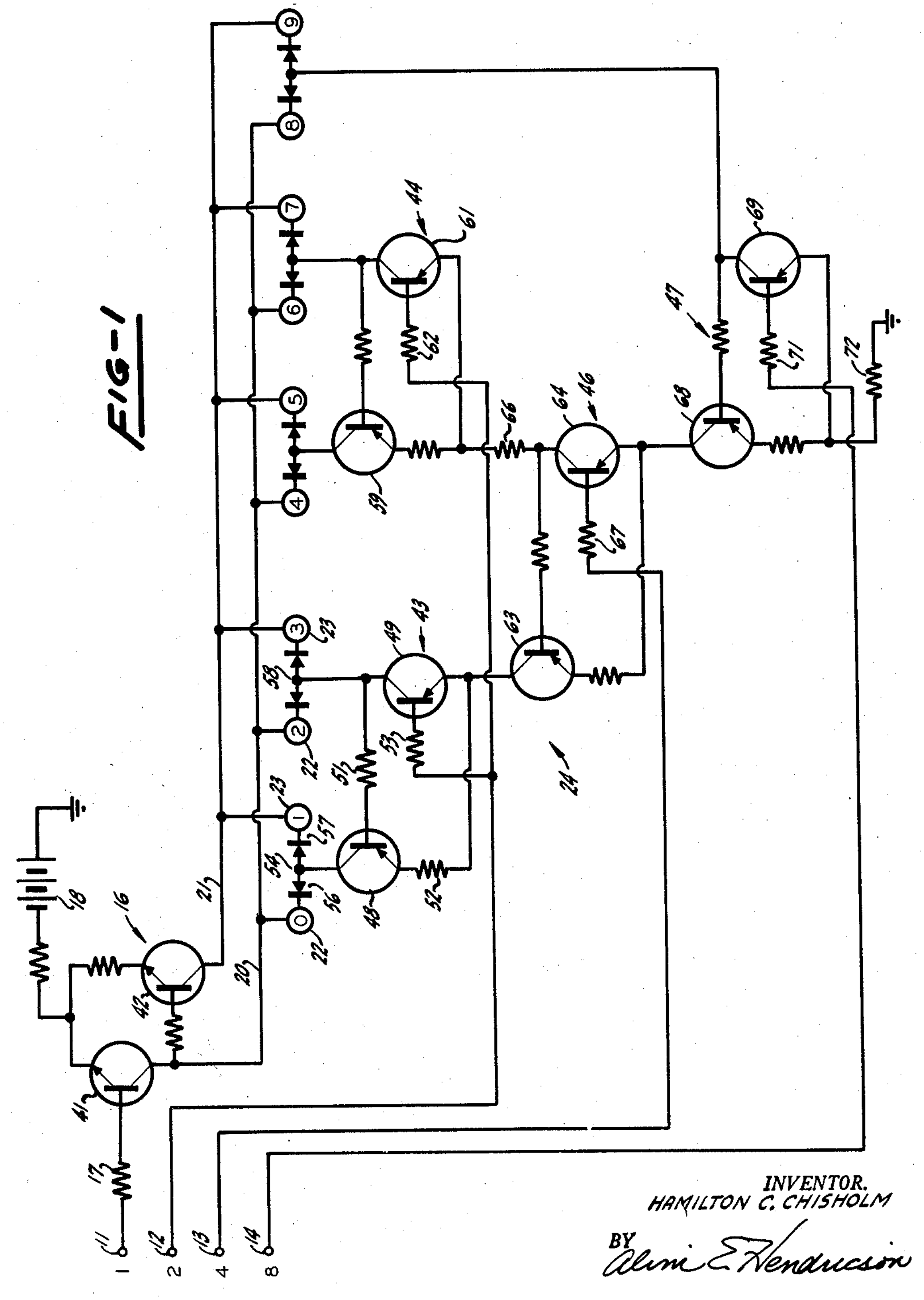
FIG. 1 is a circuit diagram of a preferred embodiment of the count indicator of the present invention.

Considering now the invention in detail, and referring to the preferred circuit embodiment illustrated in FIG. 1 of the drawings, there will be seen to be provided four input terminals 11, 12, 13 and 14 adapted to receive count pulses from an electronic counter circuit. Inasmuch as the illustrated count indicator is adapted to operate with a decade counter, these four input terminals may then receive counts one, two, four and eight count signals singly and in combination to provide the ten count signals from a decade counter and such input count signals are herein assumed with the foregoing numbers being placed adjacent the input terminals on the drawing to indicate the same. A transistor switch or trigger circuit 16 is coupled through a resistor 17 to the zero and one count input terminal 11 and this trigger circuit 16 is connected to one side of a power supply 18 that has the other side thereof grounded and is further connected to a pair of electrical conductors, hereinafter denominated as even buss 20 and odd buss 21. The transistor trigger circuit 16 is adapted to energize either the even or odd buss in accordance with either zero or one count input signals from the terminal 11, and there is further provided a plurality of visual indicating devices comprising a plurality of even count incandescent lamps 22 and odd count incandescent lamps 23. As illustrated, there are provided for decade count indicating five even indicating lamps and five odd indicating lamps, further identified in the drawing by the numbers zero to nine placed within the lamp symbols and identifying the count number that such lamp is adapted to indicate. A tree circuit 24 is provided in connection between the above-noted indicating lamps and the opposite side of the aforementioned power supply as by a ground return circuit. Electrical connection from the remaining input terminals 12, 13 and 14 to appropriate points on the switch circuits of the tree circuit provide for controlling conduction of the individual switching circuits in response to particular counts received whereby the desired indicator lamp is fully energized.

Before proceeding with a more detailed consideration of the circuit of FIG. 1 it is of interest to consider the operation of the trigger circuit 16 employed to alternately energize the even and odd busses of the count indicator, and also the operation of the individual transistor switches which will be seen upon study of the circuit of FIG. 1 to very closely resemble the trigger circuits 16 thereof.

Figures 2, 3, 4:
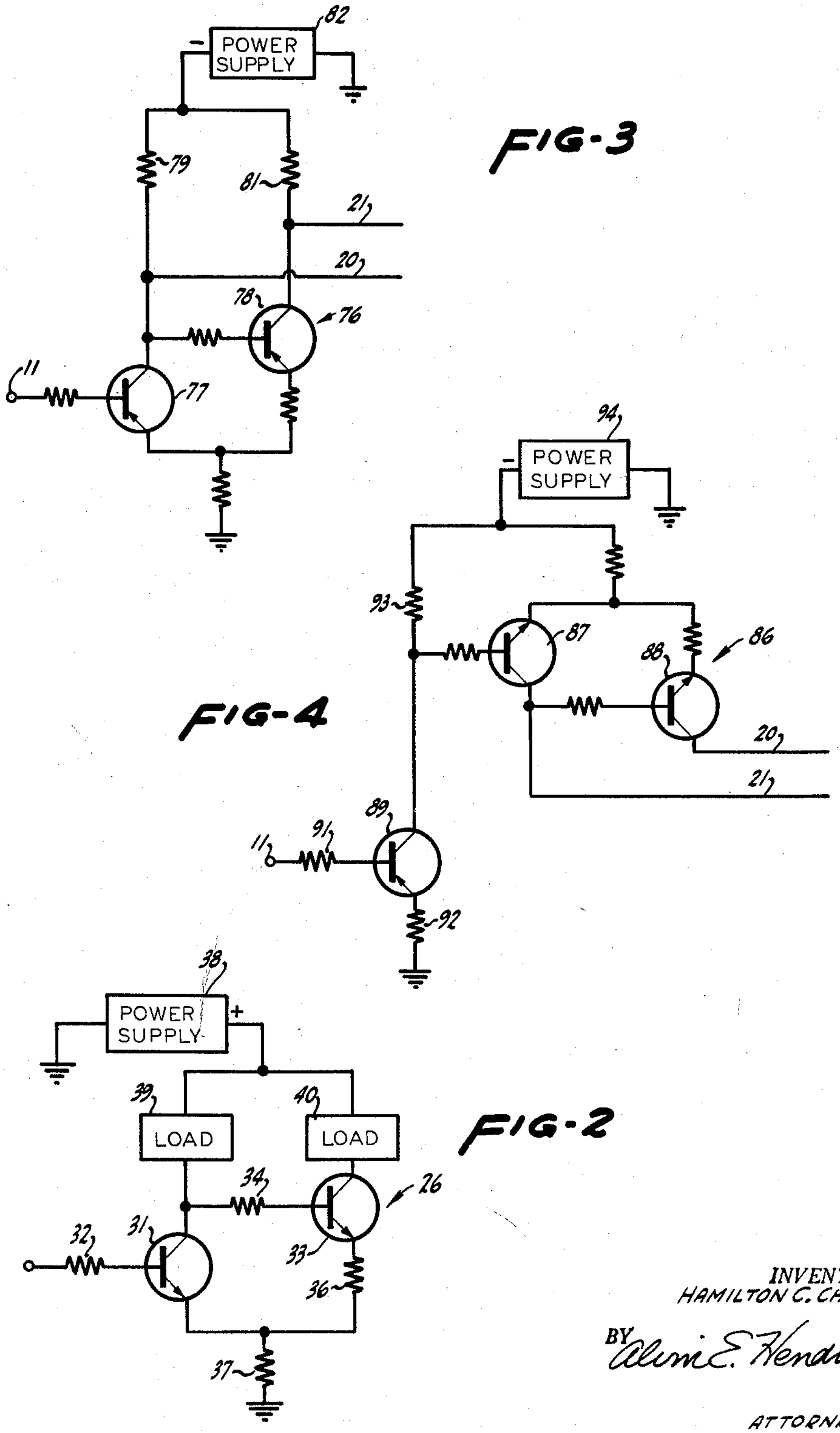
FIG. 2 is a circuit diagram of a transistor trigger circuit adapted for use in the count indicator of the present invention.
FIG. 3 is a circuit diagram of a modified trigger circuit adapted for use in the count indicator of the present invention.
FIG. 4 is a circuit diagram of yet another modification of a trigger circuit adapted for use in the count indicator of the present invention.

There is illustrated in FIG. 2 of the drawing a monostable switch circuit, or trigger circuit, which upon consideration will be seen to be substantially identical to the trigger circuit 16 of FIG. 1. As regards this trigger circuit 26 of FIG. 2 it will be noted that a first transistor 31 is connected with the base thereof coupled through a resistor 32 to an input terminal, such as the first input terminal 11 of the count indicator. A second transistor 33 has the base thereof connected through a resistor 34 to the collector of the first transistor 31, and a transistor 36 couples the emitter of the transistor 33 to the emitter of the transistor 31. A resistor 37 grounds the emitter of the first transistor 31 and a power supply 38, sometimes denoted as a B+ supply in analogy to the plate voltage supply of a vacuum tube circuit, is connected through a first resistive load 39 to the emitter of the first transistor 31 and through a second resistive load 40 to the emitter of the transistor 33. It will thus be seen that the collector-emitter circuits of each of the transistors are, in fact, connected in parallel through separate resistive loads across a power supply.

As regards operation of this circuit it will be seen that with zero input to the first transistor, i.e., a ground potential applied to the base of this transistor through the coupling resistor 32, that the transistor will be cut off so that load current does not flow in the collector-emitter circuit thereof. With the first transistor 31 in cutoff condition the base of the second transistor 33 will be maintained substantially at the B+ voltage so as to thereby bias this transistor to conduction with the base drive current limited essentially by the base resistance. The switch is designed such that the transistor 33 is current saturated and consequently the potential drop between the collector and the emitter thereof is negligible. The resistors 36 and 37 in the emitter circuits of the two transistors are made very small and thus the load current passing through the resistive load 40 is essentially limited only by the load. Application of a positive voltage pulse or positive voltage to the base of the first transistor 31 through the resistor 32 will raise the potential of this base so that the transistor 31 begins to conduct. As the transistor conducts the potential of the collector thereof will decrease and thus consequently the potential at the base of the second transistor 33 will proportionately decrease to drive this transistor toward a cutoff condition. Regeneration occurs and the second transistor is rapidly cutoff so that the entire current through the trigger circuit then passes through the load 39 and the first transistor 31 so that in fact the circuit is operated to very rapidly switch the load current between the two loads. As the potential drop between the collector and emitter of the first transistor 31 is so small as to be negligible and as the resistor 37 in series with the transistor and load across the power supply 38 is quite small, the load current is limited only by the load value. Removal of the positive voltage coupled to the base of the first transistor 31 will immediately cause this transistor to cease conduction so that the voltage of the base of the transistor 33 rapidly rises to cause the second transistor 33 to conduct and thereby to switch the load current from the load 39 to the load 40.

It will be appreciated that the above-described circuit 16 is only stable in one condition, i.e., conduction of the transistor 33 through the load 40 so that at all times when a ground potential is maintained at the base of the first transistor 31 only the second transistor 33 conducts, and only upon the application of a positive pulse to the base of the transistor 31 will this transistor conduct and cut off the other transistor to thereby switch the load current between loads. The loads 39 and 40 illustrated in FIG. 2 of the drawings were above stated to be resistive and thus may of course comprise incandescent lamps of any desired number, such as for example, as are illustrated in FIG. 1 of the drawing.

Referring again to the complete count indicator circuit of FIG. 1 is will be seen that the trigger circuit 16 thereof is connected to the power supply 18 in reverse polarity to that illustrated and described in FIG. 2 above. This polarity connection results from the fact that input count pulses at the terminals 11 to 14 of the count indicator are normally received as negative pulses from a conventional transistor decade counter. Thus, with the reverse polarity indicated in FIG. 1 the first transistor 41 thereof normally conducts inasmuch as the ground potential normally applied to the base thereof from the input terminal 11 biases the base positively with respect to the emitter of the transistor which will be seen to be connected to the negative terminal of the power supply 18. With this connection and the transistor 41 thereby normally conducting, it will be seen that the base potential of the second transistor 42 is mainatined substantially the same as the potential of the emitter inasmuch as only a very small potential drop exists between the collector and emiter of the conducting transistor 41 so that therefore the second transistor 42 is normally cut off and will, in acordance with the above description, only conduct at such times as a negative input signal is received at the input terminal 11 to thereby drive the first transistor 41 to cutoff and raise the potential of the base of the second transistor 42 with respect to the emitter hereof. A complete circuit for the transistors 41 and 42 of the trigger or switch 16 is only completed through one or more of the lamps 22, 23 and thence through selected ones of the switches comprising the above-noted tree circuit 24. As regards these transistor switches there will be seen to be provided four light switches 43, 44, 46 and 47.

Considering the transistor switch 43, same will be seen to include first and second transistors 48 and 49, respectively, connected with the base of the transistor 48 coupled through a resistor 51 to the collector of the transistor 49. The emitter of each of the transistors is joined together through a resistor 52 and the base of the second transistor 49 is coupled through a resistor 53 to the input terminal 12. Additionally, the collector of each of the transistors is connected to separate pairs of lamps. The collector of the first transistor 48 is connected to a juncture 54 between the zero and one count lamp and there are provided a pair of unidirectional conducting devices, such as crystal diodes 56 and 57, connected in opposition between such juncture 54 and the lamps 22 and 23. In the illustrated circuit these diodes 56 and 57 are connected back-to-back at the juncture 54 to conduct away from the juncture to the lamps 22 and 23 respectively, and similar connections are provided for each of the additional pairs of lamps noted above so that current directed into one lamp is prevented from dividing and flowing into other lamps. The collector of the transistor 49 is connected to a juncture 58 between the two and three count lamps of the circuit. The transistor switch 44 is identical to the above described switch 43 and includes transistors 59 and 61 with the collector of the transistor 59 connected through diodes to the juncture between the four and five count lamps and the collector of the transistor 61 connected through diodes to the juncture of the six and seven count lamps. A resistor 62 couples the base of the transistor 61 to the input terminal 12. The transistor switch 46 is again a duplicate of the above-described switches and includes a first transistor 63 and a second transistor 64 coupled together as above described. The transistor switch 46 has the collector of the first transistor 63 directly connected to the emitter of the transistor 49 in the switch 43 while the collector of the transistor 64 is coupled through a resistor 66 to the emitter of the transistor 61 in the switch 44. Also, a resistor 67 couples the base of the transistor 64 to the four count input terminal 13. The final transistor switch 47 includes a pair of transistors 68 and 69 coupled together as above with the collector of the transistor 69 directly connected to the juncture of the eight and nine count lamps through diodes as previously described.

The base of this same transistor 69 is connected through a resistor 71 to the eight count input terminal 14 and the emitter of the same transistor is connected to ground through a resistor 72 to thereby complete a ground return circuit to the opposite side of the power supply 18.

It will be appreciated that each of the transistor switches 43, 44, 46, and 47 operate in the same manner as the switch described above and illustrated in FIGURE 2. Thus, one of the transistors in each of the switches is normally conducting and the other transistor conducts only upon receipt by the switch of a count signal which transfers conduction through the switch to the alternate conducting path only so long as the count signal persists, with the switch then reverting back to a stable state with the original transistor conducting.

Considering now the operation of the above described count indicator circuit, it is first to be noted that in the absence of any count storage in the counter circuit with which the present invention is adapted to be connected there will be maintained at each of the input terminals 11 to 14 a ground potential. In this instance the count indicator is adapted to light the zero count lamp and such is herein accomplished in the following manner. A ground potential coupled through the input resistor 17 from the input terminal 11 to the base of the transistor 41 biases this base positively with respect to the emitter thereof which is connected to the negative terminal of the power supply 18. Consequently, the transistor 41 conducts and thereby maintains the second transistor 42 of the trigger or switch circuit 16 in a non-conducting state. It will be seen that under these circumstances the even buss 20 is energized through the switch 16 so that therefore each of the even count lamps is adapted to be energized and the particular lamp which is in fact energized is chosen by the tree circuit 24. In the above zero count example wherein all of the input terminals are maintained at ground potential, it will be seen that the transistors 49 and 61 are biased to cutoff by the ground potential applied to the resistors 53 and 62 from the terminal 12 so that therefore the alternate transistors of these switches will conduct. With the transistor 48 conducting there will be seen to be provided a current path from the even buss 20 through the zero count lamp and diode 56 through the transistor 48 down to the switch 46 and with the transistor 64 of this switch biased to cutoff by the ground potential applied to the resistor 67 from the input terminal 13 then the circuit is yet further completed through the conducting transistor 63 of the switch 46. The final transistor switch 47 has the transistor 69 thereof biased to cutoff by the ground potential applied from the input terminal 14 through the resistor 71 to the base thereof and consequently the other transistor 68 of this switch is maintained in conducting condition so that a circuit is thereby completed from ground through the resistor 72 and the transistors 68, 63, 48, and the zero count lamp to the even buss and thence back through the transistor 41 to the opposite terminal of the power supply so that there flows in this circuit a sufficient current to light the zero count lamp.

Analysis of the circuit of FIGURE 1 will show that the above-described circuit is the only possible complete load circuit through any of the indicator lamps in the condition wherein all of the input terminals are maintained at ground potential. Thus, for example, it was noted above that the transistor 59 of the switch 44 is biased to conduct; however, it will be seen that this transistor 59 is connected in series with the transistor 64 of the switch 46 which was also noted above to be biased against conduction and to thereby be cut off. Consequently no complete circuit is possible through either of the transistors of the switch 44, and consequently none of the lamps connected thereto can be energized. Likewise, the transistor switch 47 which has the transistor 59 thereof connected through the eight and nine count lamps does not complete a circuit therethrough inasmuch as the transistor 69 is maintained in cutoff condition by the ground potential applied to the base thereof from the input terminal 14. It is to be appreciated, however, that although a single lamp, in the above instance the zero count lamp, is energized to incandescence for any particular input count, yet current flows through other lamps in the circuit. For example, the transistor 68 of the switch 47 will be seen to derive base drive current through the base resistor which is connected to the juncture of the eight and nine count lamps. Inasmuch as the base drive current is quite small for each of the transistors 68 through the eight count lamp on the energized even buss 20 is insufficient to light the lamp and consequently this lamp operates only as a resistive circuit element under those conditions wherein it is connected only through the base circuit of transistors in the switches rather than through the load circuits thereof. Similarly in the above example, the transistor 63 has the base drive current supplied through a circuit including the four count lamp and the transistor 48 has the base drive current supplied through the resistor 51 and the two count lamp from the even buss.

It is to be particularly noted as regards the switches of the present invention that the switch or trigger circuit 16 connected to the zero and one count input terminal is illustrated as being composed of transistors of the NPN junction type in order that this switch may function in series with the load current. In order to maintain the desired potential relationships in the count indicator circuit it is then necessary to employ transistors of opposite conductivity type in the switches 43, 44, 46 and 47. Consqeuently there are illustrated PNP type transistors in these tree switches. Although maximum efficiency is obtained from the above-noted transistor circuitry, it is possible to reverse the conductivity type, as discussed below.

As a further example of operation of the invention, consider the situation wherein the decade counter has stored a single count therein. Under such condition there will be applied to the input terminal 11 of the count indicator a negative voltage pulse which will then, as above described, drive the transistor 41 to cutoff whereby the other transistor 42 of the switch 16 conducts substantially at current saturation to provide an alternate current path through this trigger circuit whereby the odd buss 21 is energized from the power supply 18. Inasmuch as the potential at the remaining input terminals 12, 13 and 14 remains at ground potential, the transistors in the switches of the tree circuit 24 remain in the same conducting state described above, and consequently the only difference from the above example is that current flows through the one count lamp from the transistor 48 to the odd buss 21. When the decade counter has stored two counts therein, the one count input terminal 11 of the count indicator is returned to ground potential whereby the transistor 41 is driven to conduction to thereby cutoff the transistor 42 so that the switch 16 then connects the negative power supply terminal to the even buss 20. With a two count storage at the decade counter there is applied a negative voltage pulse at the two count input terminal 12 of the count indicator so that there is thereby applied a negative voltage pulse to the base of the transistor 49 and to the base of the transistor 61 whereby these transistors are baised to conduct.

Conduction of the transistors 49 and 61 will thereby drive the companion transistors 48 and 59 to cutoff, in the manner discussed above. The remaining switches 46 and 47 are not affected inasmuch as ground potential is yet applied to the input terminals 13 and 14 connected thereto. Thus, it will be seen that biasing of the transistor 49 to conduct will cause same to be connected in a complete circuit from the even buss 20 and two count lamp through the transistors 63 and 68 to complete the circuit. On the other hand, the transistor 61 biased to conduct is connected in series with the cutoff transistor 64 so that it is not possible for transistor 61 to conduct through a load circuit thereof and consequently the six count lamp connected thereto is not energized to incandescence.

It will be appreciated from the above circuit description and discussion of operation thereof that the four transistor switches forming the tree circuit 24 select the pairs of lamps which are to be energized for any particular count collection and the trigger or switch 16 selects the even or odd buss for energization to thereby pick which one of the two lamps in the selected pair shall be energized to incandescence. The voltage drop through each of the switches of the tree circuit 24 is so small as to be almost negligible in comparison with the supply voltage and consequently a very large portion of the available power is employed in operating the selected lamp so that the over-all circuit operation is thereby quite efficient. Furthermore, with the circuitry described above there is provided a substantially simplified count indicator circuit employing a minimum number of readily controllable elements and providing a positive visual indication of a number of counts stored in a counter circuit. Inasmuch as all of the elements employed in the above described circuit are quite minute as well as being light-weight and inexpensive, there is hereby provided a highly practical and useful count indicator circuit which is particularly adapted for utilization with transistorized counters inasmuch as visual indication is normally not possible therewith, owing to the low power available in such circuits.

As noted above, transistors of the NPN type are shown as being employed in the trigger circuit 16 in order that the switch may operate in series with the load current; however, it is possible to modify this circuit in order to employ PNP type transistors. Such a modification is illustrated in FIGURE 3 of the drawing wherein the switch or trigger circuit 76 employs PNP transistors 77 and 78 connected in substantially the same manner as discussed in connection with FIGURE 2 above; however, with the difference that the load lines, herein comprising the even and odd busses 20 and 21, are connected to the collectors of the transistors 77 and 78 respectively. It will be seen that, with resistors 79 and 81 connected from the negative terminal of a power supply 82 to the collectors of the transistors 77 and 78 respectively, the switch delivers its load current into one or other of the resistors 79 or 81 in series with the even and odd busses. In this instance the load current must be sufficient to drive the even or odd buss to a low potential such that the lamp connected to it cannot be energized. As the load current is consequently necessarily larger and furthermore parallels the load current delivered to the selected indicating lamp the power efficiency of the system is somewhat reduced. Advantage does, however, lie in the utilization of this type of switch 76 in that same is adapted for control from the first bistable circuit of a decade counter even though such counter circuit operates at a substantially lower power level than the count indicator circuit. Thus, with a counter circuit operating at a very low supply voltage, as is normally desired for transistorized counter circuit, there would in the circuit of FIGURE 1 be a substantial difference in the voltage level for the decade counter and for the indicator. Although the circuit of FIGURE 1 will yet operate to select the pairs of lamps in accordance with counts stored in the counter, difficulty may arise in operation of the trigger circuit 16 for even and odd buss selection to thereby select an individual lamp of the pair energized. The circuit of FIGURE 3 is operable to overcome this difficulty for the transistors thereof operate at a relatively low potential and consequently are capable of being readily controlled from a low level bistable counter element.

Inasmuch as the operation of the trigger circuit of FIGURE 3 is, as noted above, somewhat inefficient an alternative arrangement is possible as shown in FIGURE 4. The circuit of FIGURE 4 includes a trigger or switch circuit 86 which is substantially identical to the circuit 16 of FIGURE 1. The transistors 87 and 88 of this circuit are again NPN type transistors adapted for connection in series with the load current and control thereover is herein provided by an additional amplifying transistor 89 of the PNP type. This transistor 89 has the base thereof coupled through a resistor 91 to the zero count input terminal 11 of the count indicator. The emitter of the transistor 89 is connected through a resistor 92 to ground and the load circuit is completed by connection of the collector of the transistor through a resistor 93 to the negative terminal of a power supply 94. Input signals to the switch 86 are provided by resistive coupling between the base of the first trigger transistor 87 and the collector of the amplifying transistor 89. It will be appreciated that the amplifying transistor 89 inserts a phase reversal so that it is necessary to employ a reverse polarity of the busses inasmuch as the transistor 88 of the trigger circuit 86 is the one that is normally conducting in this instance. Despite the disadvantage of adding a further circuit element in the form of an amplifying transistor 89 it has been found that the advantage derived therefrom far outweighs the disadvantage of additional circuit components in that a substantially greater efficiency of power conversion is attained and the count indicator circuit is thereby adapted to provide requisite count indications from a very low level counter circuit.

Additional modifications of the present invention are of course possible within the scope thereof and thus, for example, variations or alterations in the polarity of the even-odd busses and of the switches employed in the circuit are possible so that, for example, the zero lamp on the drawing may be made to correspond to the number one lamp and vice versa as well as similar variations in the remaining lamp pairs with a corresponding polarity reversal to accomplish energization of the correct lamp for the particular count received by the count indicator. It is further possible to provide a latching indicator retaining most of the basic functions of the above-described circuit. Such a latching indicator would employ a bistable electronic switch with a memory which may be arranged in series parallel combination and driven, however, by alternating current coupled signals rather than direct current coupled signals as described above for the transistor switching circuit. It will be appreciated that for a latching indicator system employing bistable circuits to operate correctly it is first necessary for the indicator to be reset to a known state, usually the zero indicating state, and such reset may be accomplished by any one of several known methods as, for example, by driving each of the inputs with a positive pulse whereby the bistable circuits will be triggered to the states which conduct current to the number zero lamp. In addition to the latching feature available with this alternate circuitry another advantage attaches thereto in that the supply voltage is not limited by considerations of drive to the bistable circuits as was the case above in the transistor switch circuitry therein described. Furthermore, it will be appreciated that although the present invention has been disclosed and described with respect to a one, two, four, eight binary code that a circuit is in no way limited thereto and is particularly well adapted, for example, to a one, two, two, four binary coded input, and may with only minor modification be equally well adapted for count indication of other types of coded input. Additionally, the present invention may be employed to selectively energize other types of resistive loads besides the incandescent lamps illustrated and is in fact adapted for a variety of switching applications.

What is claimed is:

1. A visual count indicator comprising
a plurality of input terminals,
a first transistor control means having a control terminal, a common terminal, and a pair of output terminals for providing alternately conductive paths between said common terminal and one or the other of said output terminals upon the application of a predetermined signal to said control terminal,
a first voltage terminal adapted to be connected to a source of voltage,
means connecting said first voltage terminal to said common terminal,
a first and a second control buss,
means respectively connecting said output terminals to said first and second busses,
a plurality of pairs of means for producing radiant energy, each of said means having first and second terminals,
a pair of diodes connected back to back between said first terminals of said means of each of said pairs of means,
means connecting the second terminal of a first means of each pair to said first buss,
means connecting the second terminal of a second means of each pair to said second buss,
at least second and third transistor control means, each of which has a control terminal, a common terminal and two output terminals,
means connecting one of said input terminals to the control terminals of said second and third transistor control means, means connecting the output terminals of said second and third transistor control means with respective junctions between said pairs of diodes, and
means connecting the common terminals of said second and third transistor control means to a second voltage terminal adapted to be connected to a voltage source.

2. A count indicator as in claim 1, wherein
each of said means for producing radiant energy comprises an incandescent lamp.

3. A count indicator as in claim 2, wherein
said means connecting the common terminals of said second and third transistor control means to a second voltage terminal includes at least a fourth transistor control means.

4. A count indicator as in claim 2, wherein
said means connecting the common terminals of said second and third transistor control means to a second voltage terminal includes fourth and fifth transistor control means, each of which has a control terminal, a common terminal and two output terminals,
means connecting the output terminals of said fourth transistor control means with the respective common terminals of said second and third transistor control means,
means connecting one of the output terminals of said fifth transistor control means with the common terminal of said fourth transistor control means, and the other of said output terminals with the junction between another of said pair of diodes, and
means connecting the common terminal of said fifth transistor control means to said second voltage terminal.

5. A count indicator as in claim 3, wherein
said transistor control means each includes a pair of interconnected semiconductors and said semiconductors provide alternate current paths between said common terminal and one or the other of said output terminals depending upon the signal applied to said control terminal.

References Cited in the file of this patent

UNITED STATES PATENTS

| | | |
|---|---|---|
| 2,540,442 | Grosdoff | Feb. 6, 1951 |
| 2,756,934 | Ziffer | July 31, 1956 |
| 2,761,965 | Dickinson | Sept. 4, 1956 |
| 2,827,574 | Schneider | Mar. 18, 1958 |
| 2,831,184 | Petherick | Apr. 14, 1958 |
| 2,832,899 | Brewster | Apr. 29, 1958 |
| 2,835,829 | Sourgens | May 20, 1958 |
| 2,844,811 | Burkhart | July 22, 1958 |
| 2,934,754 | Jackel | Apr. 26, 1960 |
| 2,949,545 | White | Aug. 16, 1960 |
| 2,985,771 | Halpern | May 23, 1961 |
| 3,022,944 | Stuart | Feb. 27, 1962 |

OTHER REFERENCES

What's Inside Transac? by A. L. Cavalieri, "Electronic Design," July 15, 1956, vol. 4, No. 14, pages 30–33.

Electronics, June 1, 1957, "High Reliability Transistorized Counter," H. C. Chislom, pp. 171–173.

Electronics, October 1952, "Gated Lamp Decade Counters," R. L. Rod, pages 170–172.

Pub.: Electrical Engineering, "Transistor Count-Rate Systems," L. E. Weisner, July 1958, pages 623–625 relied upon.